(12) United States Patent
Das et al.

(10) Patent No.: US 11,769,291 B2
(45) Date of Patent: Sep. 26, 2023

(54) METHOD AND DEVICE FOR RENDERING POINT CLOUD-BASED DATA

(71) Applicant: SAMSUNG ELECTRONICS CO., LTD., Suwon-si (KR)

(72) Inventors: Nachiketa Das, Bangalore (IN); Raghavendra Holla, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 17/533,765

(22) Filed: Nov. 23, 2021

(65) Prior Publication Data
US 2022/0084278 A1  Mar. 17, 2022

Related U.S. Application Data

(63) Continuation of application No. PCT/KR2020/006764, filed on May 25, 2020.

(30) Foreign Application Priority Data

May 23, 2019  (IN) .............................. 201941020519
May 19, 2020  (IN) .............................. 201941020519

(51) Int. Cl.
*G06T 15/08* (2011.01)
*G06T 15/04* (2011.01)
(Continued)

(52) U.S. Cl.
CPC .............. *G06T 15/08* (2013.01); *G06T 15/04* (2013.01); *G06T 15/20* (2013.01); *G06T 15/40* (2013.01); *G06T 2210/56* (2013.01)

(58) Field of Classification Search
None
See application file for complete search history.

(56) References Cited

U.S. PATENT DOCUMENTS 10,535,161 B2   1/2020  Budagavi et al.
2014/0328535 A1  11/2014  Sorkine-Hornung
(Continued)

FOREIGN PATENT DOCUMENTS

KR   10-2018-0122947 A   11/2018
KR   10-2019-0053129 A   5/2019

OTHER PUBLICATIONS

Christian Gunther et al, "A GPGPU-based Pipeline for Accelerated Rendering of Point Clouds," Journal of WSCG, vol. 21, 2013, pp. 153-162.
(Continued)

*Primary Examiner* — Nurun Flora
(74) *Attorney, Agent, or Firm* — Sughrue Mion, PLLC (57) ABSTRACT

A method and apparatus for rendering point cloud-based volumetric data are provided. The method includes receiving, at a computing device, a plurality of two-dimensional (2D) frames associated with a three-dimensional (3D) point cloud, and projection metadata comprising details of projection of the 3D point cloud into a 2D image plane; reconstructing, by the computing device, a plurality of 3D points associated with the 3D point cloud, based on the received 2D frames and the projection metadata; and generating texture images based on the plurality of 3D points; and rendering at least one quad image based on the texture images.

17 Claims, 7 Drawing Sheets

(51) Int. Cl.
    *G06T 15/20*    (2011.01)
    *G06T 15/40*    (2011.01)

(56) References Cited

U.S. PATENT DOCUMENTS

| | | |
|---|---|---|
| 2014/0362081 A1 | 12/2014 | Cerny et al. |
| 2016/0343166 A1* | 11/2016 | Inoko ..................... G06T 15/00 |
| 2017/0116780 A1* | 4/2017 | Han ....................... G06T 17/005 |
| 2018/0033184 A1 | 2/2018 | Jin et al. |
| 2018/0164440 A1 | 6/2018 | Fried et al. |
| 2018/0268570 A1 | 9/2018 | Budagavi et al. |
| 2018/0302612 A1 | 10/2018 | Kopf et al. |
| 2018/0324240 A1 | 11/2018 | Fleureau et al. |
| 2019/0018730 A1 | 1/2019 | Charamisinau et al. |
| 2019/0087978 A1 | 3/2019 | Tourapis et al. |
| 2019/0087979 A1 | 3/2019 | Mammou et al. |
| 2019/0108679 A1 | 4/2019 | Wang et al. |
| 2019/0197739 A1 | 6/2019 | Sinharoy et al. |
| 2020/0045344 A1* | 2/2020 | Boyce ................. H04N 21/816 |

OTHER PUBLICATIONS

Eurico Manuel Rodrigues Lopes, "Adaptive Plane Projection for Video-based Point Cloud Coding," Tecnico Lisboa, Thesis to obtain the Master of Science Degree in Electrical and Computer Engineering, Nov. 2018, Total 114 pages.

International Search Report (PCT/ISA/210) dated Aug. 26, 2020, issued by the International Searching Authority in International Application No. PCT/KR2020/006764.

Written Opinion (PCT/ISA/237) dated Aug. 26, 2020, issued by the International Searching Authority in International Application No. PCT/KR2020/006764.

* cited by examiner

| | | | |
|---|---|---|---|
| Color Data | . . . | | . . . |
| Geometry Data | . . . | | . . . |
| Occupancy Data | . . . | | . . . |
| Projection Metadata | . . . | x_min = 400<br>y_min = 0<br>x_max = 672<br>y_max = 240<br>prdir = 3 | . . . |

FIG. 6

METHOD AND DEVICE FOR RENDERING POINT CLOUD-BASED DATA

CROSS-REFERENCE TO RELATED APPLICATION(S)

This application is a by-pass continuation of International Application No. PCT/KR2020/006764, filed on May 25, 2020, which based on and claims priority to Indian Provisional Patent Application No. 201941020519, filed on May 23, 2019, and Indian Complete Patent Application No. 201941020519, filed on May 19, 2020, the disclosures of which are incorporated by reference herein in their entireties.

BACKGROUND

1. Field

The present disclosure generally relates to rendering volumetric videos, and particularly relates to efficiently rendering cloud-based volumetric videos.

2. Description of Related Art

Projection-based methods have been considered for compressing point cloud data. In these methods, the point cloud data are projected onto a two-dimension (2D) image plane in order to utilize the current 2D video coding standards for compressing such content. Projection-based approaches introduce 30%-60% of redundant data along with the actual data in 2D image plane. Graphics processing unit (GPU) rendering pipeline is not optimized for rendering points. The processing of redundant point along with original data in GPU rendering pipeline, results in reduced performance, due to which the real-time rendering of dynamic point cloud (at 60 fps) is difficult to achieve on mobile devices.

Typical GPUs process exponentially more pixels for each point. Performing point based operations like re-projection and processing rendering steps necessary for point clouds in GPU rendering pipeline, results in reduced performance.

Accordingly, there is a need for a solution increasing the efficiency of the rendering process and filtering out redundant points.

SUMMARY

Provided are a method and device for rending point cloud-based data according which may increase the efficiency of the rendering process for point cloud by filtering out redundant points.

Additional aspects will be set forth in part in the description which follows and, in part, will be apparent from the description, or may be learned by practice of the presented embodiments.

In accordance with an aspect of the disclosure, there is provided a method of rendering point cloud-based volumetric data, the method including: receiving, at a computing device, a plurality of two-dimensional (2D) image frames corresponding to a three-dimensional (3D) point cloud, and projection metadata including data of projecting the 3D point cloud into a 2D image plane; reconstructing a plurality of 3D points corresponding to the 3D point cloud, based on the plurality of 2D image frames and the projection metadata; generating texture images based on the plurality of 3D points; and rendering at least one quad image based on the texture images.

Each of the plurality of 2D image frames may include a plurality of pixels, and the reconstructing the plurality of 3D points may include: identifying redundant pixels from each of the plurality of 2D image frames based on occupancy metadata corresponding to each of the plurality of 2D image frames; and removing the redundant pixels from the plurality of 2D image frames.

The occupancy metadata may include information about a number of the redundant pixels.

The reconstructing the plurality of 3D points may further include: identifying non-redundant pixels among each of the plurality of 2D image frames by discarding the redundant pixels; and determining locations of each of the non-redundant pixels in a 3D space based on the projection metadata.

The occupancy metadata may include at least one of information of points located on a line lying in a direction of the projecting the 3D point cloud into the 2D image plane, information of a number of the points located on the line lying in the direction of the projecting the 3D point cloud into the 2D image plane, binary information about occupant pixels, or binary information about the redundant pixels.

The redundant pixels may include a set of pixels excluding at least one point, and the set of pixels and the at least one point may correspond to the points located on the line lying in the direction of the projecting the 3D point cloud into the 2D image plane and a number of the set of pixels.

The information of points located on the line lying in the direction of the projecting the 3D point cloud into the 2D image plane may include coordinate information of the points located on the line lying in the direction of the projecting the 3D point cloud into the 2D image plane.

The projection metadata may include geometry information of the plurality of 3D points, visual information of the plurality of 3D points 3D points, position information of pixels corresponding to the plurality of 3D points in a 3D space, and color information of the pixels corresponding to the plurality of 3D points.

The projection metadata may include at least one of 3D coordinate values of 3D point cloud in a 3D space when projecting the 3D point cloud into the 2D image plane, 2D coordinate values of 3D point cloud in a 2D space when each of the 3D point cloud is projected onto the 2D image plane, or linking information which links the 3D coordinate values and the 2D coordinate values.

The method may further include generating, based on screen space projection data, screen space projection image by projecting the plurality of 3D points to a screen space domain, wherein the screen space projection data may include at least one of information about one or more camera parameters or one or more perspective projection parameters.

The method may further include: obtaining viewing information associated with a viewing application requesting rendering of the plurality of 3D points, wherein the viewing information may include a position of a reference viewing point, an orientation of the reference viewing point, and information associated with a field of view determined from the reference viewing point; obtaining screen space projection based on the viewing information associated with the viewing application; discarding, from the plurality of 3D points, one or more 3D points that are projected outside the screen space projection to obtain a first subset of 3D points placed on at least one line of sight associated with the screen space projection; performing a depth test on the first subset of 3D points to obtain a second subset of 3D points; and projecting the second subset of 3D points to the screen space domain to generate the screen space projection image.

The projecting the second subset of 3D points to the screen space domain may include projecting the second subset of 3D points to the screen space domain based on the screen space projection data.

The one or more camera parameters may include an upward vector, a view direction, and a camera location, and the one or more perspective projection parameters include a field of view, a near plane location and a far plane location.

In accordance with an aspect of the disclosure, there is provided an apparatus for rendering point cloud-based volumetric data, the apparatus including: a memory storing instructions; at least one processor configured to execute the instructions to: receive a plurality of two-dimensional (2D) image frames corresponding to a three-dimensional (3D) point cloud, and projection metadata including data of projecting the 3D point cloud into a 2D image plane, reconstruct a plurality of 3D points corresponding to the 3D point cloud, based on the plurality of 2D image frames and the projection metadata, and generate texture images based on the plurality of 3D points; and a display configured to render at least one quad image based on the texture images.

Each of the plurality of 2D image frames may include a plurality of pixels, and the at least one processor may be further configured to execute the instructions to identify redundant pixels from each of the plurality of 2D image frames based on occupancy metadata corresponding to each of the plurality of 2D image frames, and remove the redundant pixels from the plurality of 2D image frames.

The at least one processor may be further configured to execute the instructions to: identify non-redundant pixels among each of the plurality of 2D image frames by discarding the redundant pixels, and determine locations of each of the non-redundant pixels in a 3D space based on the projection metadata.

The at least one processor may be further configured to execute the instructions to generate, based on screen space projection data, screen space projection image by projecting the plurality of 3D points to a screen space domain, and the screen space projection data may include at least one of information about one or more camera parameters or one or more perspective projection parameters.

The at least one processor may be further configured to execute the instructions to: obtain viewing information associated with a viewing application requesting rendering of the plurality of 3D points, wherein the viewing information may include a position of a reference viewing point, an orientation of the reference viewing point, and information associated with a field of view determined from the reference viewing point, obtain screen space projection based on the viewing information associated with the viewing application, discard, from the plurality of 3D points, one or more 3D points that are projected outside the screen space projection to obtain a first subset of 3D points placed on at least one line of sights associated with the screen space projection, perform a depth test on the first subset of 3D points to obtain a second subset of 3D points, and project the second subset of 3D points to the screen space domain to generate the screen space projection image.

The at least one processor may be further configured to execute the instructions to project the second subset of 3D points to the screen space domain based on the screen space projection data.

In accordance with an aspect of the disclosure, there is provided a non-transitory computer readable medium storing computer readable instructions that are executable by a processor to perform a method of rendering point cloud-based volumetric data, the method including: receiving, at a computing device, a plurality of two-dimensional (2D) image frames corresponding to a three-dimensional (3D) point cloud, and projection metadata including data of projecting the 3D point cloud into a 2D image plane; reconstructing a plurality of 3D points corresponding to the 3D point cloud, based on the plurality of 2D image frames and the projection metadata; generating texture images based on the plurality of 3D points; and rendering at least one quad image based on the texture images.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following detailed description describes the terms used in the disclosure and embodiments in detail.

As the terms used herein, general terms that are currently widely used are selected by taking functions in the disclosure into account, but the terms may have different meanings according to an intention of one of ordinary skill in the art, precedent cases, advent of new technologies, etc. Furthermore, specific terms may be arbitrarily selected by the applicant, and in this case, the meaning of the selected terms will be described in detail in the detailed description of a corresponding embodiment of the disclosure. Thus, the terms used herein should be defined not by simple appellations thereof but based on the meaning of the terms together with the overall description of the disclosure.

Throughout the disclosure, when an element "includes" or "comprises" an element, unless there is a particular description contrary thereto, the element may further include other elements, not excluding the other elements. Furthermore, terms, such as "portion," "module," etc., used herein indicate a unit for processing at least one function or operation and may be embodied as hardware or software or a combination of hardware and software.

Embodiments of the disclosure will now be described more fully hereinafter with reference to the accompanying drawings so that they may be easily implemented by those of ordinary skill in the art. However, the disclosure may have different forms and should not be construed as being limited to embodiments of the disclosure set forth herein. In addition, parts not related to descriptions of the disclosure are omitted to clearly explain embodiments of the disclosure in the drawings, and like reference numerals denote like elements throughout.

According to the disclosure, functions may operate via one or more processors and a memory. The one or more processors may be a general-purpose processor such as a central processing unit (CPU), an application processor (AP), or a digital signal processor (DSP), a dedicated graphics processor such as a graphics processing unit (GPU) or a vision processing unit (VPU), and/or a dedicated artificial intelligence (AI) processor such as a neural processing unit (NPU). The one or more processors may control input data to be processed according to predefined operation rules or an AI model stored in the memory. Alternatively, when the one or more processors are a dedicated AI processor, the dedicated AI processor may be designed with a hardware structure specialized for processing a particular AI model.

For the purpose of promoting an understanding of the principles of the disclosure, reference will now be made to the embodiment illustrated in the drawings and specific language will be used to describe the same. It will nevertheless be understood that no limitation of the scope of the disclosure is intended, such alterations and further modifications in the illustrated system, and such further applications of the principles of the disclosure as illustrated therein being contemplated as would normally occur to one skilled in the art to which the disclosure relates Embodiments of the present subject matter are described below in detail with reference to the accompanying drawings.

Figure 1A:
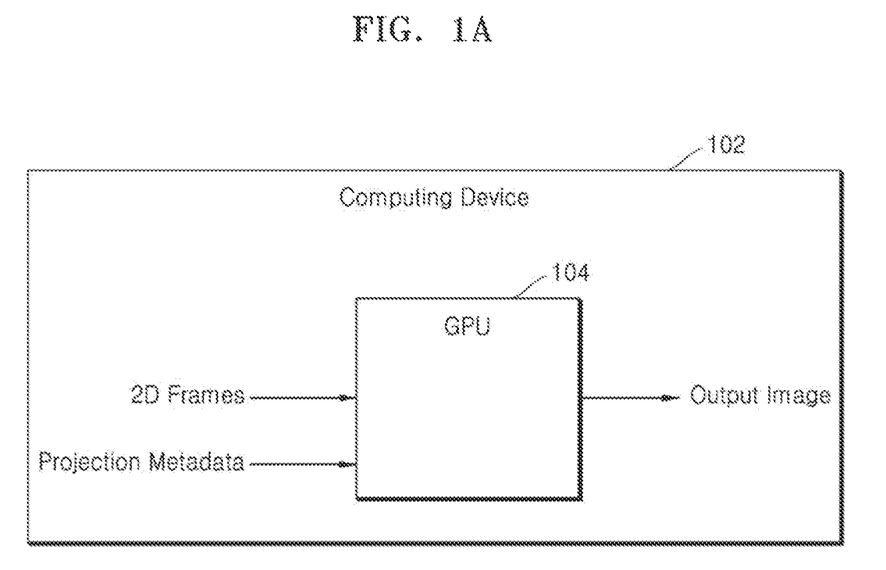
FIG. 1A illustrates a block diagram of rendering point cloud-based volumetric videos, in accordance with an embodiment of the disclosure.

FIG. 1A illustrates a block diagram of rendering point cloud-based volumetric videos, in accordance with an embodiment of the disclosure.

In an embodiment, examples of the computing device 102 may include, but are not limited to, a smartphone, a laptop, a tablet, a desktop computer, and a server. In an example, the computing device 102 may be implemented for rendering point cloud-based volumetric videos. In an example, the computing device 102 may include a GPU 104. Alternatively, the GPU 104 may be replaced by a general purpose processor if the general purpose processor is capable of processing graphic images.

According to an example embodiment of the present disclosure, the GPU 104 may be configured to efficiently rendering point cloud-based volumetric videos. In an example embodiment, the GPU 104 may be configured to receive a plurality of two-dimensional (2D) frames. The plurality of 2D frames may be obtained by projecting corresponding three-dimensional (3D) point cloud to a 2D image plane. Furthermore, the GPU 104 may be configured to receive projection metadata along with the plurality of 2D frames. In an embodiment, the plurality of 2D frames may be a plurality of 2D image frames.

In an embodiment, the projection metadata may include details of projection of the 3D point cloud into the 2D image plane. The projection metadata is typically generated while compressing the 3D point cloud data to the 2D image plane and meanwhile the plurality of 2D frames corresponding to the 3D point cloud in the 2D image plane. The projection metadata may be used to obtain the 3D point cloud data conversely based on the plurality of 2D frames.

The terms of point cloud and point cloud data may be used interchangeably throughout the detailed description.

In an embodiment, the GPU 104 may be configured to reconstruct a plurality of 3D points corresponding to the 3D point cloud-based on the received plurality of 2D frames and the projection metadata. Subsequently, the reconstructed plurality of 3D points is used to render a quad image. More particularly, a screen-space projection image based on the reconstructed plurality of 3D points may be generated. Subsequently, based on the screen-space projection image, the quad image may be generated. In an example, the quad image may be a full-screen quad image.

As will be understood, all the images pertaining to the volumetric video are rendered in a manner as described above. As the computing device 102 includes the GPU 104 for reconstruction of the 3D cloud points, a non-limiting advantage provided by the disclosure includes maximizing efficiency in terms of processing the number of 2D frames representing the 3D point cloud. Further, the disclosure includes filtering out redundant pixels before projecting the 3D point cloud into the plurality of 2D frames in the 2D image plane to increase the performance of the system.

Furthermore, as would be described in detail later, the GPU 104 implements mechanisms to reduce the redundancy associated with reconstruction of the 3D point cloud data. This further aids in speeding up the rendering of the volumetric video, as processing of the redundant data is avoided.

Figure 1B:
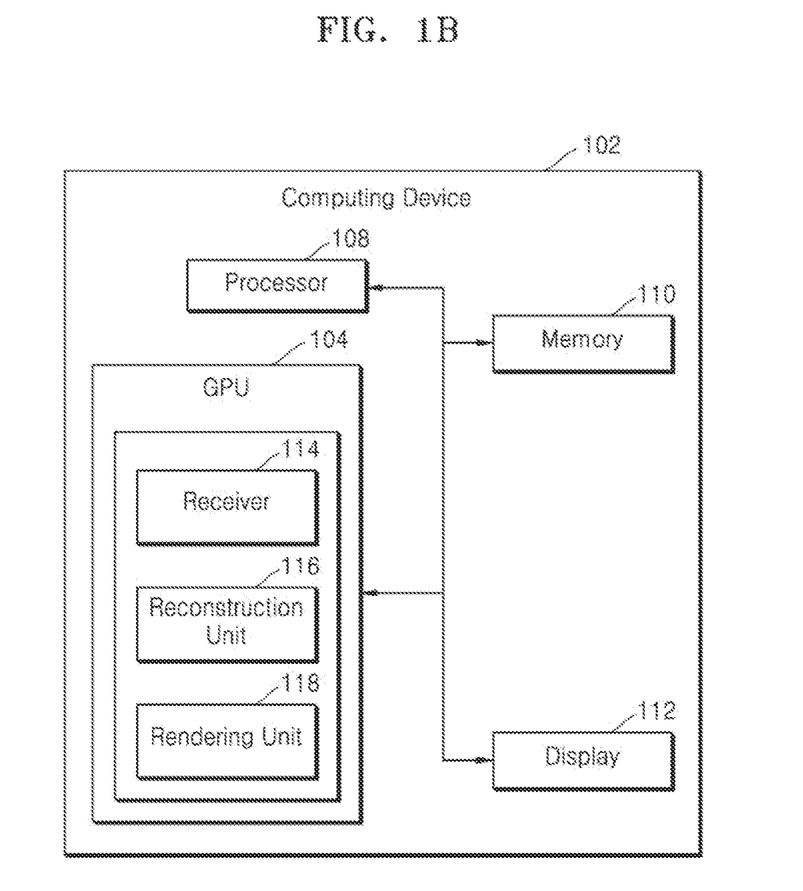
FIG. 1B illustrates a schematic block diagram of a computing device for rendering point cloud-based volumetric videos, in accordance with an embodiment of the disclosure.

FIG. 1B illustrates a schematic block diagram of a computing device for rendering point cloud-based volumetric videos, in accordance with an embodiment of the disclosure.

In an embodiment, the computing device 102 may include the GPU 104, a processor 108, a memory 110, and a display 112. In an example, the GPU 104, the processor 108, the memory 110, and the display 112 may be communicatively coupled to one another.

Referring to FIG. 1B, although the GPU 104 and the processor 108 of the computing device 102 are depicted as separate components, the GPU 104 and the processor 108 may be implemented as one processor when the processor 108 may be able to perform both functions performed by the GPU 104 and the processor 108.

In an embodiment, the GPU 104 may be a computing shader. The computing shader is parallel processors which perform parallel processing of multiple tasks or fast processing of a plenty of tasks with the GPU 104. As will be appreciated, other computing devices may also be suitably implemented. Furthermore, the computing device 102 may be implemented as one or more of a hardware, a software, a logic based program, a configurable hardware, and the like. In an example embodiment, the GPU 104 may include a receiver 114, a reconstruction unit 116, and a rendering unit 118.

In an embodiment, the processor 108 may be a single processing unit or a number of units, all of which could include multiple computing units. The processor 108 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 108 may be configured to fetch and/or execute computer-readable instructions and/or data (e.g., the Service data) stored in the memory 110.

In an embodiment, the memory 110 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

The memory 110 may be used as a storage for receiving and storing data processed by at least one of the processor 108, the receiver 114, the reconstruction unit 116 and the rendering unit 118. In an embodiment, the memory 110 may store 3D point cloud data, and corresponding 2D frame and metadata associated with the 2D frame.

In an example, the receiver 114, the reconstruction unit 116, and the rendering unit 118, amongst other things, include routines, programs, objects, components, data structures, etc., which perform particular tasks or implement data types. The receiver 114, the reconstruction unit 116, and the rendering unit 118 may also be implemented as, signal processor(s), state machine(s), logic circuitries, and/or any other device or component that manipulate signals based on operational instructions. Further, the receiver 114, the reconstruction unit 116, and the rendering unit 118 can be implemented in hardware, instructions executed by a processing unit, or by a combination thereof. The processing unit can comprise a computer, a processor, such as the processor 108, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In an example, the computing device 102 may be configured to render 3D point cloud-based volumetric videos. Accordingly, in an example, the GPU 104 may generate a plurality of decompressed 2D frames corresponding to a 3D point cloud.

In an embodiment, the GPU 104 receives the plurality of the 2D frames through the receiver 114. In an example, each of the 2D frame among the plurality of 2D frames, includes a plurality of pixels. In an example, along with the plurality of 2D frames, the receiver 114 may further receive projection metadata. As described above referring to FIG. 1A, the projection metadata may include details of projection of the 3D point cloud into the 2D image plane. In an example, besides the aforementioned details, the projection metadata may further include additional information, such as 3D coordinate values of each 3D point cloud in a 3D space when projecting the 3D point cloud into the 2D image plane, 2D coordinate values of each 3D point cloud in a 2D space when the 3D point cloud is projected onto the 2D image plane, and linking information which links the 3D coordinate values and the 2D coordinate values.

In an embodiment, the projection metadata further includes geometry information of the 3D points corresponding to the 3D point cloud, visual information of the 3D points corresponding to the 3D point cloud, position information of the pixels corresponding to the 3D points in a 3D space, and color information of the pixels corresponding to the 3D points.

In an embodiment, the reconstruction unit 116 may be configured to reconstruct a plurality of 3D points corresponding to the 3D point cloud-based on the received plurality of 2D frames and the projection metadata.

In an example embodiment, to reconstruct the plurality of 3D points, the reconstruction unit 116 may be configured to filter out a plurality of pixels corresponding to each of the plurality of 3D frames, based on redundancy of the plurality of pixels. More particularly, for each of the 2D frame of the plurality of 2D frames, the reconstruction unit 108 may obtain occupancy metadata. The occupancy metadata may include information about a set of redundant pixels present in the 2D frame.

In an example, the occupancy metadata may include binary information for encoding validity of the pixel. More specifically, the binary digit 1 may correspond with valid occupied pixels, and the binary digit 0 may correspond to redundant pixels.

Figure 5:
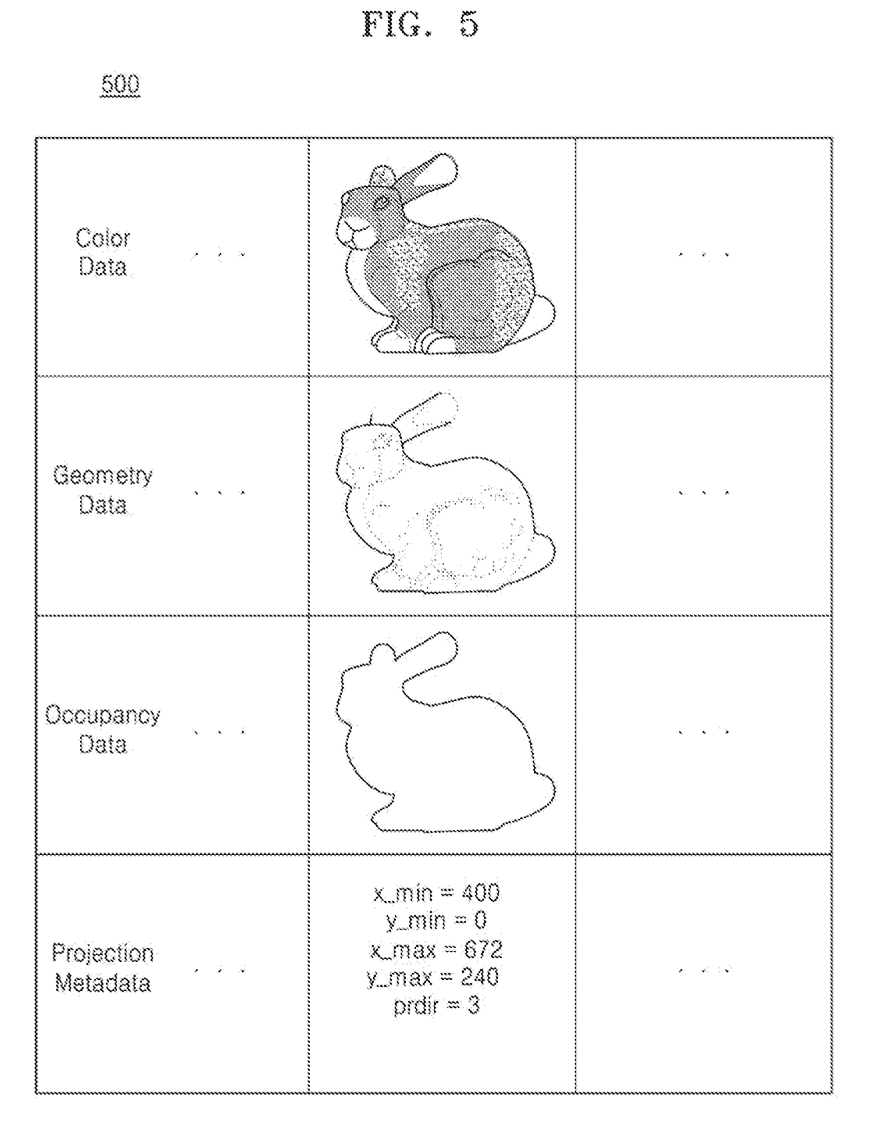
FIG. 5 illustrates an example dataset representing various type of data utilized for rendering point cloud-based volumetric videos, in accordance with an embodiment of the disclosure.

FIG. 5 is now referred to for a detailed explanation of the occupancy metadata.

FIG. 5 illustrates an example dataset representing various type of data utilized for rendering point cloud-based volumetric videos, in accordance with an embodiment of the disclosure. In another embodiment, the occupancy metadata may be multiplexed and encoded together with the geometry data or the color data, as is illustrated in FIG. 5.

In an embodiment, the occupancy metadata may include information of points located on a line which is in a direction of projecting the 3D point cloud into the 2D plane, information of the number of the points located on the line lying in the direction of projecting the 3D point cloud into the 2D image plane, and information of points which are concentrated on a small area of which length is predetermined. In an embodiment, when the direction of projecting the 3D point cloud into the 2D image plane is z-axis direction, points having the same (x, y) values but different z values may become redundant pixels except for one pixel having the same (x, y) values but different z value. The occupancy metadata include information of points having the same (x, y) values but different z values when the direction of projecting the 3D point cloud into the 2D image plane is z-axis direction and/or redundant pixels.

In an embodiment, the occupancy metadata may be received by the receiver 114 along with the additional information and the projection metadata provided along with the plurality of 2D frames. Accordingly, the reconstruction unit 116 obtains or accesses the occupancy metadata during the processing of the 2D frame. Based on the obtained occupancy metadata for the 2D frame, the reconstruction unit 116 may be configured to identify a set of redundant pixels and a set of non-redundant pixels present in the 2D frame.

After identifying the set of redundant and non-redundant pixels, the reconstruction unit 116 may be configured to remove the set of redundant pixels from the 2D frame. As a result, only the set of non-redundant pixels are processed for rendering the volumetric video, thereby increasing the efficiency of rendering.

Subsequent to the removal of the set of redundant pixels, the 2D frame including the set of non-redundant pixels may be processed by the reconstruction unit 116 for reconstructing the 3D points. More particularly, the reconstruction unit 116 may be configured to identify the set of non-redundant pixels and for each pixel in the set of non-redundant pixels, the reconstruction unit 116 may determine a position in 3D space based on the projection metadata. This determined position serves as the 3D point in the 3D space. Thus, the plurality of 3D points corresponding to the 3D point cloud is formed based on the plurality of 2D frames, as described herein.

In an embodiment, once the plurality of 3D points is reconstructed, the reconstruction unit 116 may be configured to generate a screen-space image based on the plurality of 3D points. Generating the screen space image is further explained referring to FIG. 6 as below.

Figure 6:
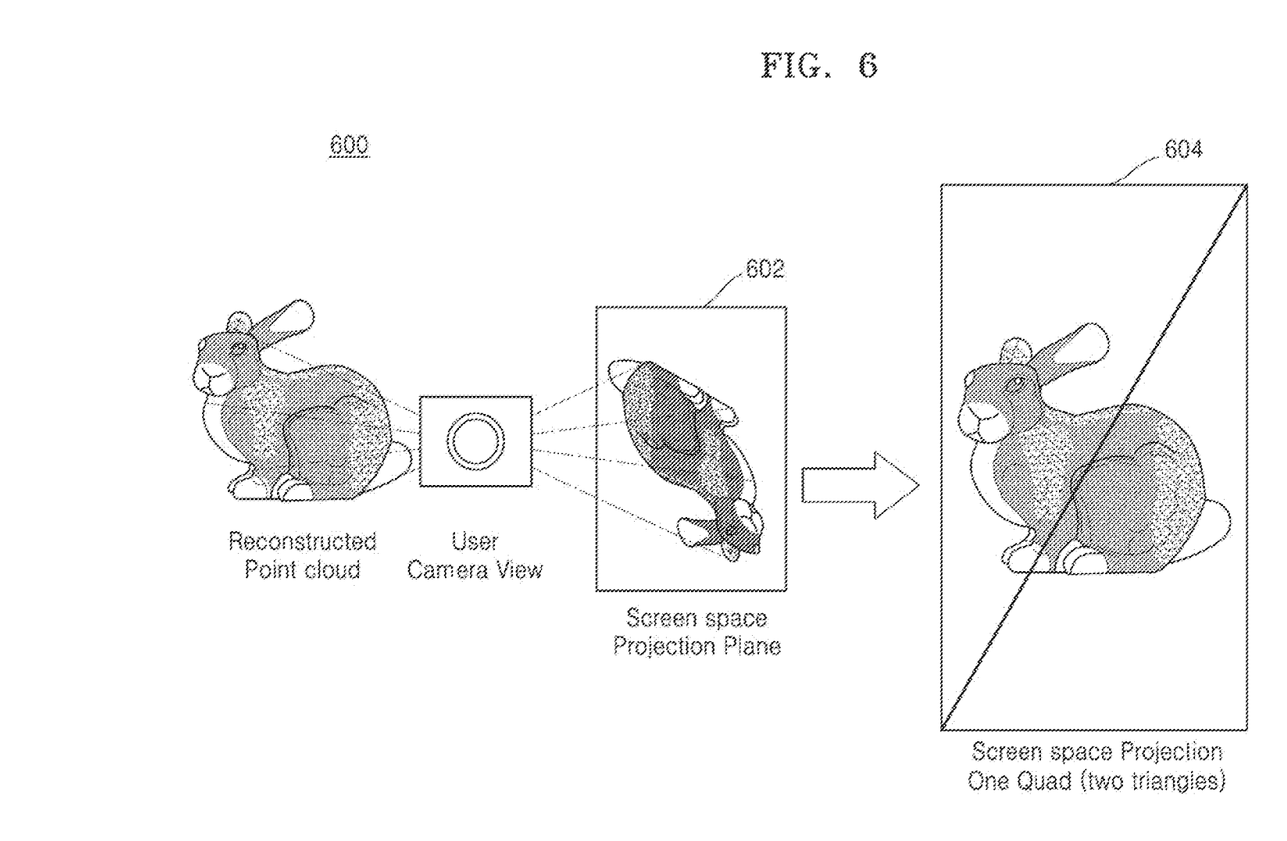
FIG. 6 illustrates an example of utilizing a screen space projection plane for generating a screen-space image, in accordance with an embodiment of the disclosure.

FIG. 6 illustrates an example of utilizing a screen space projection plane for generating a screen-space image, in accordance with an embodiment of the disclosure To that end, in an example embodiment, the reconstruction unit 116 may project the number of 3D points to a screen-space domain based on screen-space projection data. In an example, the screen-space projection data includes information about one or more camera parameters such as upward vector, view direction, focus length, lens distortion and camera location when capturing the 3D points, and one or more perspective projection parameters such as field of view, near and far plane locations. In an embodiment, the perspective projection parameters may further include aspect ratio between the height of the 2D plane and the width of the 2D plane, vertical field of view (FOV)—a vertical angle of the camera facing an object to be captured, a location of near-located z-plane and a location of far-located z-plane.

More particularly, for the projection of the 3D points in the screen-space domain, the reconstruction unit 116 calculates a screen space projection. The screen space projection may be understood as a projection area relative to (proportional to) a display 112 of the computing device 102. For example, the screen space projection could be an area or screen space relative to the display area of the computing device 102. In an example, for calculation of the screen space projection, the reconstruction unit 116 may be configured to obtain viewing information associated with a viewing application requesting the rendering of the 3D point cloud. In an example, the viewing information comprises a position of a reference viewing point, an orientation of the reference viewing point, and information associated with a field of view defined from the reference viewing point. Upon obtaining the viewing information, the reconstruction unit 116 may be configured to calculate the screen space projection based on the obtained viewing information associated with the viewing application. Thereafter, the reconstruction unit 116 may discard one or more 3D points of the plurality of 3D points that are outside the screen space projection to obtain a first subset of 3D points lying on a plurality of lines associated with the screen space projection. Subsequent to the discarding step, the reconstruction unit 116 performs a depth test on the first subset of 3D points to obtain a second subset of 3D points. In the depth test, for each of the plurality of lines, all 3D points except a first 3D point on a line of sight from the viewing position towards the line are discarded. Thereafter, the reconstruction unit 116 projects the second subset 3D points to the screen space domain to generate the screen-space projection image. The screen-space projection image is a texture image of the original image. The texture in the texture image may provide information about spatial arrangement of color and intensity in the image or in a particular area of the image.

In an embodiment, the reconstruction unit 116 may provide the screen-space projection image to the rendering unit 118. In an example embodiment, the rendering unit 118 may be configured to render a quad image based on the screen-space projection image. In an example, the rendered quad may be a full-screen quad image.

Figure 2:
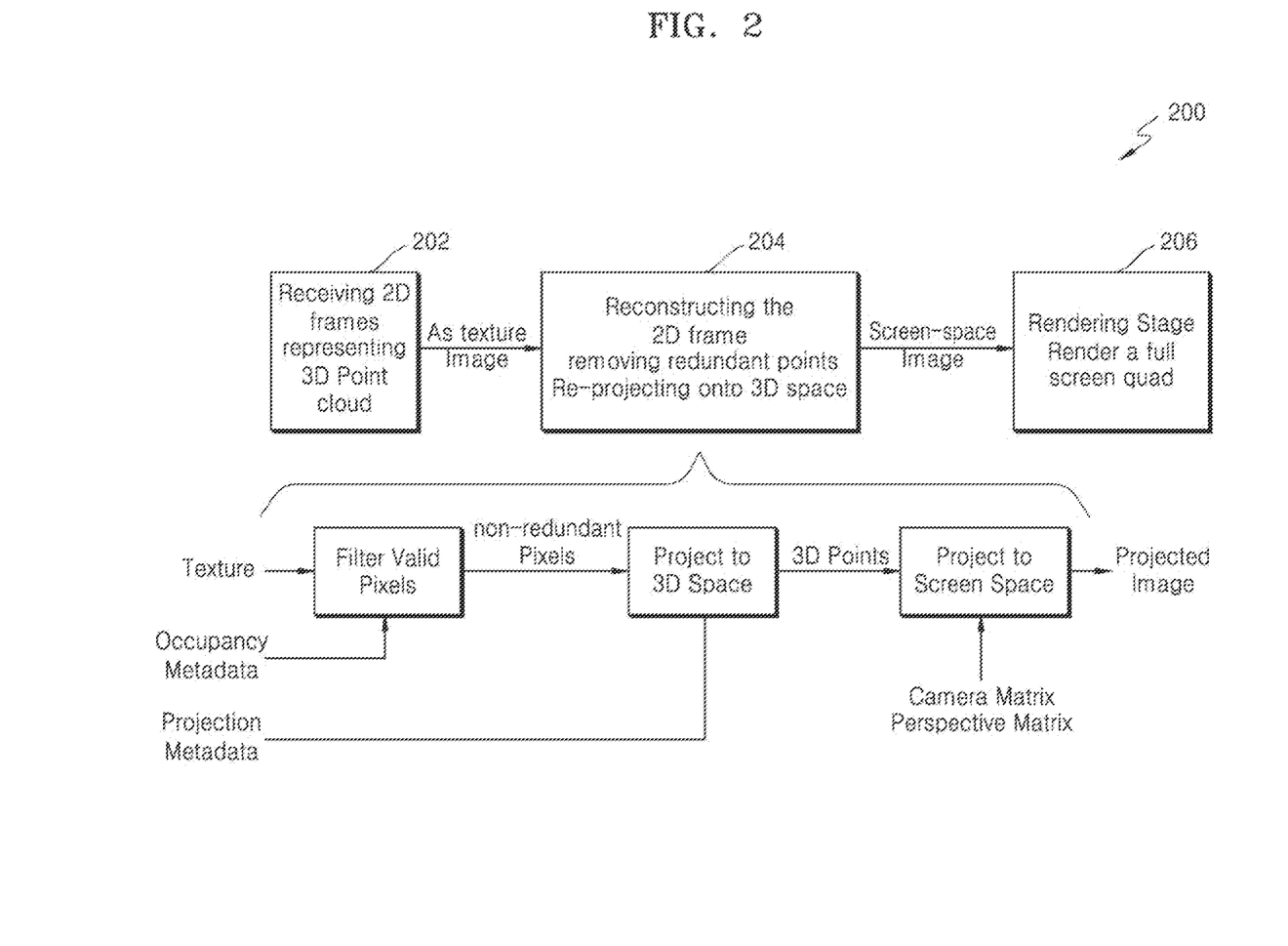
FIG. 2 illustrates a method for rendering point cloud-based volumetric videos, in accordance with an embodiment of the disclosure.

FIG. 2 illustrates a method 200 for rendering point cloud-based volumetric videos, in accordance with an embodiment of the disclosure.

In an embodiment, the rendering may be performed based on processing a plurality of 2D frames representing 3D point cloud by the GPU 104. In an example embodiment, the 2D frames include a number of pixels. In one example embodiment, the 2D frames including a set of pixels filtered out from the number of pixels may be processed for rendering the volumetric video. The filtering out of the set of the pixels may increase the efficiency of the GPU 104 along with the computing device 102. In one example embodiment, the set of pixels may be the number of non-redundant pixels described in the FIG. 1B.

Referring to FIG. 2, in operation 202, the receiver 114 may receive the plurality of 2D frames corresponding to the 3D point cloud. In an example embodiment, the receiver 114 further receives projection metadata, occupancy metadata and additional information including projection information, as part of the projection metadata, related to the 2D frames. In an example, the projection metadata may be related to and/or include the details of the projection of the 3D point cloud into a 2D image plane. In an example, the occupancy metadata may include information whether the pixels are redundant or not. Specifically, the occupancy metadata may include information related to a number of redundant pixels from the number of pixels. In one example embodiment, the additional information may include any of geometry information, visual information, position of the 2D points in a 3D space, and color of the 2D points.

In operation 204, the method 200 includes reconstructing a number of 3D points related to the 3D point cloud through the reconstruction unit 116. In an embodiment, the reconstructing may be performed based on the number of 2D frames and the projection metadata received at the receiver 114. Further, the method 200 includes processing of the 2D frames prior to the reconstructing the 3D points. In an embodiment, the processing of the 2D frames may include filtering of the number of pixels into a number of the redundant pixels and a number of non-redundant pixels based on the occupancy metadata. In an embodiment, the redundant pixels may be separated from the non-redundant pixel. The number of non-redundant pixels may be obtained by deducting the number of redundant pixels from the total number of pixels. Further, the 2D frame with the plurality of redundant pixels may be processed by the reconstruction unit 116.

Furthermore, the processing of the 2D frame including the non-redundant pixels may include identifying the number of non-redundant pixels in the 2D frames. In an embodiment, based on the identification of the number of non-redundant pixels and the projection metadata, a position in the 3D space is determined for each of the non-redundant pixels in the 2D frames. Furthermore, the reconstruction unit 116 may be capable of reading color at the positions in the 3D space for each of the non-redundant pixels.

In operation 206, the method 200 includes rendering a full screen quad based on a screen-space projection image based on the number of 3D points by the rendering unit 118.

In an embodiment, the method 200 includes generating the screen-space projection image by projecting the plurality of 3D points reconstructed by the reconstruction unit 116 into a screen-space domain. In an embodiment, the projection may be based on screen-space projection data including information related to one or more camera parameter and one or more perspective projection parameters, as explained above.

In detail, the method includes obtaining viewing information associated with a viewing application requesting the rendering of the point cloud. Herein the viewing information comprises a position of a reference viewing point, an orientation of the reference viewing point, and information associated with a field of view defined from the reference viewing point.

The method further includes calculating a screen space projection based on the obtained viewing information. Further, the method includes discarding one or more 3D points of the plurality of 3D points that are outside the screen space projection to obtain a first subset of 3D points lying on a plurality of lines associated with the screen space projection. Further, the method includes, performing a depth test on the first subset of 3D points to obtain a second subset of 3D points, where in the depth test, for each of the plurality of lines, all of the 3D points except the first 3D point placed on a line of sight from the viewing position towards the line are discarded. The method further includes projecting the second subset of 3D points to the screen space domain to generate the screen-space projection image. The screen space projected image can be interpreted as a full screen quad, i.e. two triangles in the screen space projected image used as a texture 604 as shown in FIG. 6. In this embodiment, the rendering of hundreds of thousands of points reduces to rendering of only two triangles.

Figure 3:
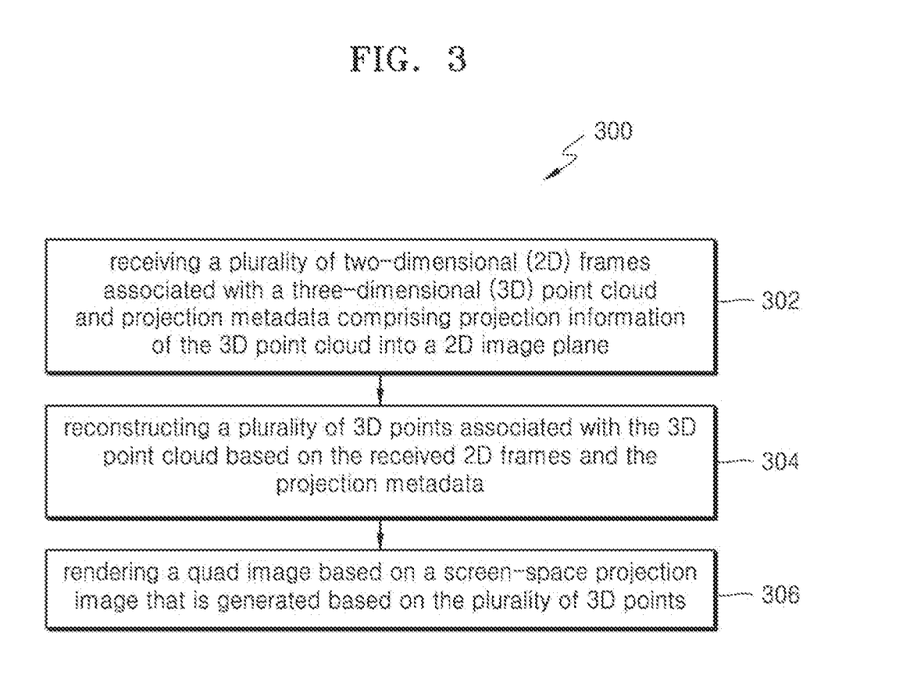
FIG. 3 illustrates a flow diagram of a method for rendering point cloud-based volumetric videos, in accordance with an embodiment of the disclosure.

FIG. 3 illustrates a flow diagram of a method 300 for rendering point cloud-based volumetric videos, in accordance with an embodiment of the disclosure.

The method 300 may be implemented by the GPU 104 using components thereof, as described above. In an embodiment, the method 300 may be executed by the receiver 114, the reconstruction unit 116, and the rendering unit 118. Alternatively, the method may be performed by the processor 108.

In operation 302, the method 300 includes receiving, by the GPU 104, a plurality of two-dimensional (2D) frames associated with a three-dimensional (3D) point cloud and projection metadata comprising details of projection of the 3D point cloud into a 2D image plane.

In operation 304, the method 300 includes reconstructing, by the computing device, a plurality of 3D points associated with the 3D point cloud, based on the received 2D frames and the projection metadata.

In operation 306, the method 300 includes rendering a full-screen quad based on a screen-space projection image that is generated based on the plurality of 3D points.

Figure 4:
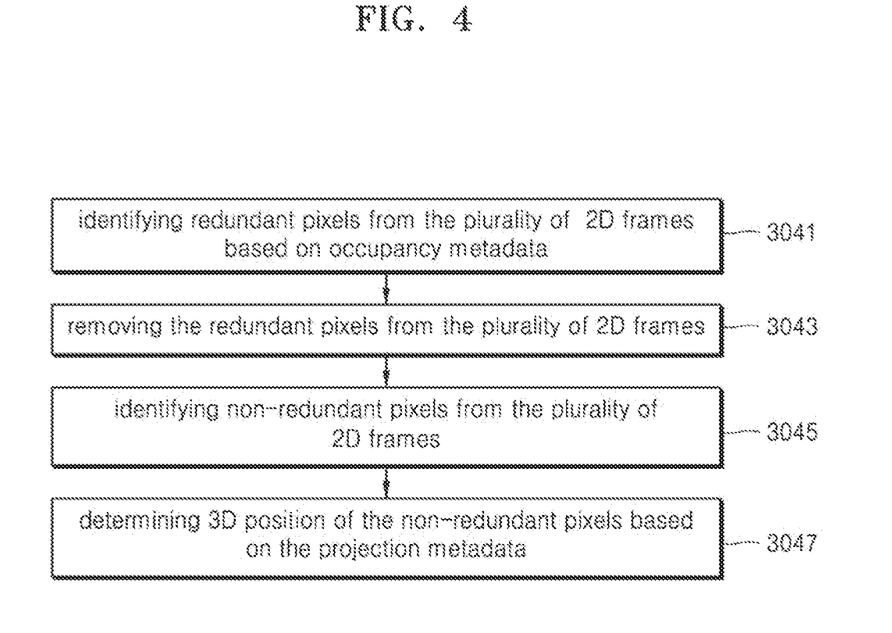
FIG. 4 illustrates a flow diagram for reconstructing a plurality of three-dimensional points, in accordance with an embodiment of the disclosure.

FIG. 4 illustrates a flow diagram for reconstructing a plurality of three-dimensional points, in accordance with an embodiment of the disclosure.

FIG. 4 describes operation 304 of FIG. 3 in detail.

In operation 3041, the GPU 104 may identify the redundant pixels from the plurality of 2D frames associated with the 3D point cloud (data) based on occupancy metadata.

In operation 3043, the GPU 104 may remove the redundant pixels from the plurality of 2D frames.

In operation 3045, the GPU 104 may identify the non-redundant pixels from the plurality of 2D frames.

In operation 3047, the GPU 104 may reconstruct the 3D points by determining 3D positions of the non-redundant pixels based on the projection metadata.

Embodiments according to the disclosure may be implemented through at least one software program running on at least one hardware device and performing a network management function to control components of the hardware device.

The methods according to embodiments of the disclosure may be implemented in the form of program instructions executable by various types of computers or processors and may be recorded on non-transitory computer-readable recording media. The computer-readable recording media may include program instructions, data files, data structures, etc. either alone or in combination. Examples of the computer-readable recording media include magnetic media such as hard disks, floppy disks, and magnetic tape, optical media such as compact disk read-only memory (CD-ROMs) and digital versatile disks (DVDs), magneto-optical media such as floptical disks, and hardware devices that are specially configured to store and perform program instructions, such as ROM, random-access memory, flash memory, etc. Examples of program instructions include machine code such as that generated by a compiler as well as also higher level language code executable by a computer using an interpreter or the like.

While embodiments of the disclosure have been particularly described, the embodiments of the disclosure are not to be construed as limiting the scope of the disclosure, and various changes and modifications made by those of ordinary skill in the art based on a basic concept of the disclosure also fall within the scope of the disclosure as defined by the following claims.

What is claimed is:

1. A method of rendering point cloud-based volumetric data, the method comprising:
receiving, at a computing device, a plurality of two-dimensional (2D) image frames corresponding to a three-dimensional (3D) point cloud, and projection metadata comprising data of projecting the 3D point cloud into a 2D image plane;
reconstructing a plurality of 3D points corresponding to the 3D point cloud, based on the plurality of 2D image frames and the projection metadata;
generating texture images based on the plurality of 3D points; and
rendering at least one quad image based on the texture images,
wherein each of the plurality of 2D image frames comprises a plurality of pixels, and
wherein the reconstructing the plurality of 3D points comprises:
identifying redundant pixels from each of the plurality of 2D image frames based on occupancy metadata corresponding to each of the plurality of 2D image frames, wherein the occupancy metadata comprises information of points located on a line lying in a direction of the projecting the 3D point cloud into the 2D image plane, information of the 3D points among the plurality of 3D points concentrated on a small area of which length is predetermined, information of a number of the points located on the line lying in the direction of the projecting the 3D point cloud into the 2D image plane, binary information about occupant pixels indicating pixels being valid occupied pixels, and binary information about the redundant pixels indicating pixels being redundant pixels; and
removing the redundant pixels from the plurality of 2D image frames.

2. The method of claim 1, wherein the occupancy metadata further comprises information about a number of the redundant pixels.

3. The method of claim 1, wherein the reconstructing the plurality of 3D points further comprises:
identifying non-redundant pixels among each of the plurality of 2D image frames by discarding the redundant pixels; and
determining locations of each of the non-redundant pixels in a 3D space based on the projection metadata.

4. The method of claim 1, wherein the redundant pixels comprise a set of pixels excluding at least one point, and
wherein the set of pixels and the at least one point correspond to the points located on the line lying in the direction of the projecting the 3D point cloud into the 2D image plane and a number of the set of pixels.

5. The method of claim 1, wherein the information of points located on the line lying in the direction of the projecting the 3D point cloud into the 2D image plane comprises coordinate information of the points located on the line lying in the direction of the projecting the 3D point cloud into the 2D image plane.

6. The method of claim 1, wherein the projection metadata comprises geometry information of the plurality of 3D points, visual information of the plurality of 3D points, position information of pixels corresponding to the plurality of 3D points in a 3D space, and color information of the pixels corresponding to the plurality of 3D points.

7. The method of claim 1, wherein the projection metadata comprises at least one of 3D coordinate values of 3D point cloud in a 3D space when projecting the 3D point cloud into the 2D image plane, 2D coordinate values of 3D point cloud in a 2D space when each of the 3D point cloud is projected onto the 2D image plane, or linking information which links the 3D coordinate values and the 2D coordinate values.

8. The method of claim 1, further comprising:
generating, based on screen space projection data, screen space projection image by projecting the plurality of 3D points to a screen space domain, wherein the screen space projection data comprises at least one of information about one or more camera parameters or one or more perspective projection parameters.

9. The method of claim 8, further comprising:
obtaining viewing information associated with a viewing application requesting rendering of the plurality of 3D points, wherein the viewing information comprises a position of a reference viewing point, an orientation of the reference viewing point, and information associated with a field of view determined from the reference viewing point;
obtaining screen space projection based on the viewing information associated with the viewing application;
discarding, from the plurality of 3D points, one or more 3D points that are projected outside the screen space projection to obtain a first subset of 3D points placed on at least one line of sight associated with the screen space projection;
performing a depth test on the first subset of 3D points to obtain a second subset of 3D points; and
projecting the second subset of 3D points to the screen space domain to generate the screen space projection image.

10. The method of claim 9, wherein the projecting the second subset of 3D points to the screen space domain comprises:
projecting the second subset of 3D points to the screen space domain based on the screen space projection data.

11. The method of claim 10, wherein the one or more camera parameters comprise an upward vector, a view direction, and a camera location, and the one or more perspective projection parameters comprise a field of view, a near plane location and a far plane location.

12. An apparatus for rendering point cloud-based volumetric data, the apparatus comprising:
a memory storing instructions;
at least one processor configured to execute the instructions to:
receive a plurality of two-dimensional (2D) image frames corresponding to a three-dimensional (3D) point cloud, and projection metadata comprising data of projecting the 3D point cloud into a 2D image plane,
reconstruct a plurality of 3D points corresponding to the 3D point cloud, based on the plurality of 2D image frames and the projection metadata, and
generate texture images based on the plurality of 3D points; and
a display configured to render at least one quad image based on the texture images,
wherein each of the plurality of 2D image frames comprises a plurality of pixels, and
wherein the at least one processor is further configured to execute the instructions to:
identify redundant pixels from each of the plurality of 2D image frames based on occupancy metadata corresponding to each of the plurality of 2D image frames, wherein the occupancy metadata comprises information of points located on a line lying in a direction of the projecting the 3D point cloud into the 2D image plane, information of the 3D points among the plurality of 3D points concentrated on a small area of which length is predetermined, information of a number of the points located on the line lying in the direction of the projecting the 3D point cloud into the 2D image plane, binary information about occupant pixels indicating pixels being valid occupied pixels, and binary information about the redundant pixels indicating pixels being redundant pixels; and
remove the redundant pixels from the plurality of 2D image frames.

13. The apparatus of claim 12, wherein the at least one processor is further configured to execute the instructions to:
identify non-redundant pixels among each of the plurality of 2D image frames by discarding the redundant pixels, and
determine locations of each of the non-redundant pixels in a 3D space based on the projection metadata.

14. The apparatus of claim 12, wherein the at least one processor is further configured to execute the instructions to generate, based on screen space projection data, screen space projection image by projecting the plurality of 3D points to a screen space domain, and
wherein the screen space projection data comprises at least one of information about one or more camera parameters or one or more perspective projection parameters.

15. The apparatus of claim 14, wherein the at least one processor is further configured to execute the instructions to:
obtain viewing information associated with a viewing application requesting rendering of the plurality of 3D points, wherein the viewing information comprises a position of a reference viewing point, an orientation of the reference viewing point, and information associated with a field of view determined from the reference viewing point,
obtain screen space projection based on the viewing information associated with the viewing application,
discard, from the plurality of 3D points, one or more 3D points that are projected outside the screen space projection to obtain a first subset of 3D points placed on at least one line of sights associated with the screen space projection,
perform a depth test on the first subset of 3D points to obtain a second subset of 3D points, and
project the second subset of 3D points to the screen space domain to generate the screen space projection image.

16. The apparatus of claim 15, wherein the at least one processor is further configured to execute the instructions to project the second subset of 3D points to the screen space domain based on the screen space projection data.

17. A non-transitory computer readable medium storing computer readable instructions that are executable by a processor to perform a method of rendering point cloud-based volumetric data, the method comprising:
receiving, at a computing device, a plurality of two-dimensional (2D) image frames corresponding to a three-dimensional (3D) point cloud, and projection metadata comprising data of projecting the 3D point cloud into a 2D image plane;
reconstructing a plurality of 3D points corresponding to the 3D point cloud, based on the plurality of 2D image frames and the projection metadata;
generating texture images based on the plurality of 3D points; and
rendering at least one quad image based on the texture images,
wherein each of the plurality of 2D image frames comprises a plurality of pixels, and
wherein the reconstructing the plurality of 3D points comprises:
identifying redundant pixels from each of the plurality of 2D image frames based on occupancy metadata corresponding to each of the plurality of 2D image frames, wherein the occupancy metadata comprises information of points located on a line lying in a direction of the projecting the 3D point cloud into the 2D image plane, information of the 3D points among the plurality of 3D points concentrated on a small area of which length is predetermined, information of a number of the points located on the line lying in the direction of the projecting the 3D point cloud into the 2D image plane, binary information about occupant pixels indicating pixels being valid occupied pixels, and binary information about the redundant pixels indicating pixels being redundant pixels; and
removing the redundant pixels from the plurality of 2D image frames.

\* \* \* \* \*